United States Patent
Holloway et al.

(10) Patent No.: US 9,719,688 B2
(45) Date of Patent: Aug. 1, 2017

(54) PCM MODULES/PACKS/PCM ARRANGEMENTS

(75) Inventors: Mathew Holloway, London (GB); Karina Torlei, London (GB); Daniel Becerra, London (GB); William Linsey Penfold, London (GB)

(73) Assignee: VKR Holdings A/S, Hoersholm (DK)

( * ) Notice: Subject to any disclaimer, the term of this patent is extended or adjusted under 35 U.S.C. 154(b) by 555 days.

(21) Appl. No.: 12/866,662

(22) PCT Filed: Feb. 11, 2009

(86) PCT No.: PCT/GB2009/000377
§ 371 (c)(1),
(2), (4) Date: Oct. 19, 2010

(87) PCT Pub. No.: WO2009/101398
PCT Pub. Date: Aug. 20, 2009

(65) Prior Publication Data
US 2011/0179807 A1    Jul. 28, 2011

(30) Foreign Application Priority Data
Feb. 11, 2008    (GB) .................................. 0802445.7

(51) Int. Cl.
*F25D 17/04* (2006.01)
*F24F 5/00* (2006.01)
(Continued)

(52) U.S. Cl.
CPC .......... *F24F 5/0017* (2013.01); *F24F 5/0021* (2013.01); *F24F 5/0035* (2013.01);
(Continued)

(58) Field of Classification Search
CPC ...... F24F 5/0017; F24F 5/0021; F24F 5/0042; F24F 5/0035; F28D 20/021;
(Continued)

(56) References Cited

U.S. PATENT DOCUMENTS

| 4,625,710 A | 12/1986 | Harada et al. |
| RE32,461 E * | 7/1987 | Di Peri ..................... F28D 5/00 |
| | | 62/314 |

(Continued)

FOREIGN PATENT DOCUMENTS

| CN | 1403756 | 3/2003 |
| CN | 1451921 | 10/2003 |

(Continued)

OTHER PUBLICATIONS

International Search Report for PCT/GB2009/000377 dated Nov. 2, 2009.

*Primary Examiner* — Justin Jonaitis
*Assistant Examiner* — Larry Furdge
(74) *Attorney, Agent, or Firm* — Stoel Rives LLP

(57) ABSTRACT

A transportable PCM (phase change material) module comprises a number of PCM packs; a housing for thermally insulting said number of PCM packs from a module's surrounding medium; spaces separating said packs and forming one or more channels for the flow of a fluid; said housing incorporating a fluid inlet and a fluid outlet; whereby, in use, fluid flows through said channels from said inlet to said outlet. A PCM (phase change material) pack comprises a laminate of a first conducting panel and a second conducting panel enclosing a portion formed primarily of PCM; wherein said portion of PCM incorporates thermal conductors.

15 Claims, 19 Drawing Sheets

(51) Int. Cl.
*F28D 20/02* (2006.01)
*F28D 20/00* (2006.01)

(52) U.S. Cl.
CPC .......... *F24F 5/0042* (2013.01); *F28D 20/021* (2013.01); *F28D 2020/0026* (2013.01); *Y02E 60/145* (2013.01); *Y02E 60/147* (2013.01)

(58) Field of Classification Search
CPC .......... F28D 2020/0026; Y02E 60/145; Y02E 60/147; Y02B 30/545
USPC ............ 62/3.62, 406, 419, 430, 435, 457.9, 62/524.1, 530
See application file for complete search history.

(56) References Cited

U.S. PATENT DOCUMENTS

| | | | |
|---|---|---|---|
| 4,781,243 A | 11/1988 | DeVogel et al. | |
| 4,936,377 A | 6/1990 | DeVogel et al. | |
| 5,804,266 A * | 9/1998 | Salyer | 428/35.2 |
| 6,059,016 A * | 5/2000 | Rafalovich et al. | 165/41 |
| 6,482,332 B1 * | 11/2002 | Malach | 252/70 |
| 7,386,967 B2 | 6/2008 | Guthmann | |
| 7,931,979 B2 | 4/2011 | Choi et al. | |
| 2003/0131623 A1 * | 7/2003 | Suppes | 62/324.1 |
| 2011/0089386 A1 | 4/2011 | Berry et al. | |

FOREIGN PATENT DOCUMENTS

| | | |
|---|---|---|
| CN | 2679560 | 2/2005 |
| CN | 2742791 | 11/2005 |
| DE | 3245027 | 6/1984 |
| DE | 29903863 | 12/1999 |
| DE | 20310593 | 3/2003 |
| DE | 20310593 | 10/2003 |
| DE | 10303498 | 8/2004 |
| DE | 102005055378 | 5/2007 |
| DE | 102006030830 | 1/2008 |
| JP | 01217136 | 8/1989 |
| JP | 05248779 | 9/1993 |
| JP | 2002130739 | 9/2002 |
| WO | WO2007/042621 | 4/2007 |
| WO | WO2007042621 | 4/2007 |

* cited by examiner

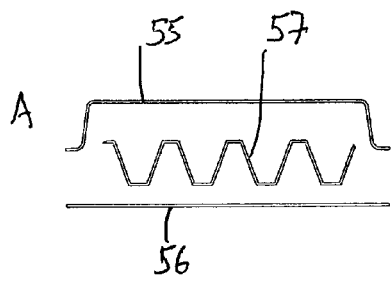
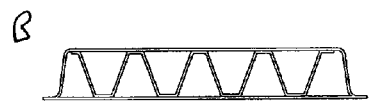
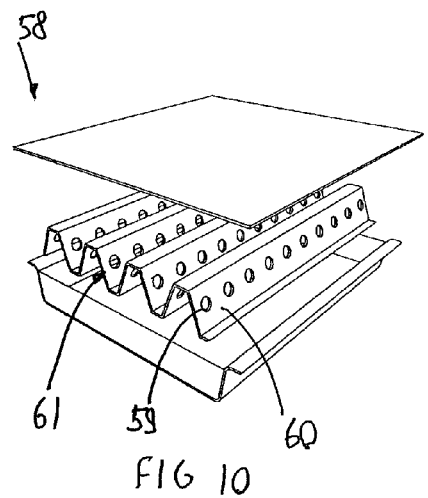
FIGS 9
FIG 10
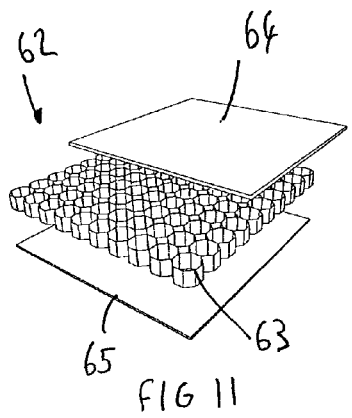
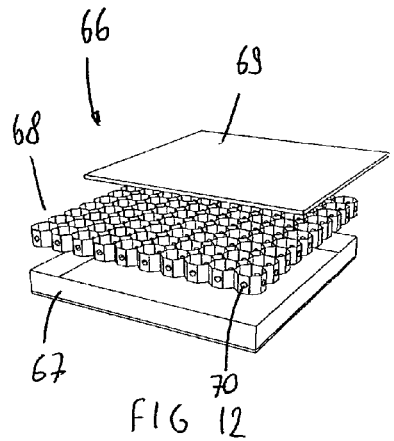
FIG 11
FIG 12

A

B

PCM MODULES/PACKS/PCM ARRANGEMENTS

CROSS-REFERENCE TO RELATED APPLICATIONS

This application is a national stage application under 35 U.S.C. §371 of International Application No. PCT/GB2009/000377, titled PCM MODULES/PACKS/PCM ARRANGEMENTS, filed Feb. 11, 2009, which claims priority to Great Britain Application No. 0802445.7, filed Feb. 11, 2008, both of which are hereby incorporated by reference in their entireties.

FIELD OF THE INVENTION

The invention relates to PCM modules, PCM packs and arrangements.

BACKGROUND TO THE INVENTION AND PRIOR ART KNOWN TO THE APPLICANT(S)

The following prior art documents have been identified: US2006/0185817, EP1947404, EP1455156, EP1739376, EP1455155, DE20314018 and DE20310593.

SUMMARY OF THE INVENTION

In a first broad independent aspect, the invention provides a transportable PCM (phase change material) module comprising a number of PCM packs; a housing for thermally insulting said number of PCM packs from a module's surrounding medium; spaces separating said packs and forming one or more channels for the flow of a fluid; said housing incorporating a fluid inlet and a fluid outlet; whereby, in use, fluid flows through said channels from said inlet to said outlet.

This configuration is particularly advantageous because it allows systems to be built up from a number of modules for variable energy requirement. It may also reverse conventional thinking when it is configured without any driven or powered component in the module. It may thus allow for retrofitting to existing air flow systems. It also improves energy usage effectiveness.

In a subsidiary aspect, said inlet and/or said outlet incorporates one or more flow regulating valves. If the module consists of these components only it further reduces the number of components necessary and allows for particularly compact modules compared to module incorporating power components per module.

In a further subsidiary aspect, said PCM packs are arranged substantially side by side. In this configuration, the cooling is advantageous.

In a further subsidiary aspect, said PCM packs are separated by one or more thermal conductors extending transversely and forming said channels. This allows the PCM portion to be of greater effective volume and therefore improves its effectiveness.

Further aspects improve one or more of the following: the effectiveness of the PCM, the turbulence of the flow, the compactness of the system relative to its effectiveness, its overall packaging weight and its manufacturing requirements.

In a further subsidiary aspect, said thermal conductors take the form of a corrugated sheet.

In a further subsidiary aspect, at least one of said PCM pack incorporates a corrugated wall forming a channel for the flow of fluid.

In a further subsidiary aspect, a number of projections are provided in at least one of said channels.

In a further subsidiary aspect, at least one of said PCM pack incorporates a wall from which projections project into said channel.

In a further subsidiary aspect, the or each PCM pack comprises a laminate of a first conducting panel and a second conducting panel enclosing a portion formed primarily of PCM; wherein said portion of PCM incorporates thermal conductors.

In a further subsidiary aspect, said thermal conductors extend in a transverse direction from one or both of said conducting panels.

In a further subsidiary aspect, said thermal conductors form hexagonal cells when viewed in plan.

In a further subsidiary aspect, said laminate further incorporates a corrugated thermally conductive panel.

In a further subsidiary aspect, said laminate incorporates a third conductive panel and a fourth conductive panel enclosing a second portion formed primarily of PCM; and a corrugated thermally conductive panel located between said second and third conductive panels.

In a further subsidiary aspect, said laminate incorporates a plurality of projections on said panels.

In a further subsidiary aspect, said thermally conductive panels are selected from the group comprising aluminium based material, steel based material, and plastics material.

In a further subsidiary aspect, said PCM is selected from the group comprising a salt, a salt based hydrate, a mixture of salt, and/or salt based hydrate, and/or an organic material.

In a further subsidiary aspect, said salt based hydrate are selected from the group comprising hydrated calcium chloride or hydrated sodium sulphate.

In a further subsidiary aspect, said salt based hydrate incorporates a thickening agent selected from the group comprising Xanthan and/or Laponite.

In a further subsidiary aspect, said organic material is paraffin based.

In a further subsidiary aspect, said thermal conductors incorporate a conductive compound mixed into said PCM.

In a further subsidiary aspect, said thermal conductor is a carbon based compound mixed into said PCM.

In a further subsidiary aspect, said carbon based compound is carbon black.

In a further subsidiary aspect, said thermal conductors incorporate wire wool or chemical carbon nanotubes.

In a further subsidiary aspect, said module further incorporates a pettier cooler.

In a further subsidiary aspect, said module further incorporates an evaporative cooler.

In a second broad independent aspect, the invention provides an air conditioning arrangement, comprising:
one or more transportable PCM modules according to any of the preceding claims; and
at least one transportable control module incorporating a housing with an inlet and an outlet; and a pump for causing, in use, the flow of fluid from said inlet to said outlet;
wherein said arrangement incorporates a conduit for linking said transportable control module to said transportable PCM modules.

In a subsidiary aspect, said control module incorporates a first and a second inlet located on separate sides of said housing and a valve configured to regulate the intake between said inlets.

In a further subsidiary aspect, said control module incorporates an internal conduit between said inlet and said outlet; said internal conduit comprising two adjacent paths, one of which incorporates a pump and a second of which incorporates a non-return valve.

In a further subsidiary aspect, said arrangement further comprises a transportable backup module incorporating one of a heat pump, an inverter, a pettier cooler, or an evaporative cooler; and further incorporating means for linking said backup module to said PCM module.

In a third broad independent aspect, a PCM (phase change material) pack comprises a laminate of a first conducting panel and a second conducting panel enclosing a portion formed primarily of PCM; wherein said portion of PCM incorporates thermal conductors.

In a subsidiary aspect, said thermal conductors extend in a transverse direction from one or both of said conducting panels.

In a further subsidiary aspect, said thermal conductors form hexagonal cells when viewed in plan.

In a further subsidiary aspect, said laminate further incorporates a corrugated thermally conductive panel.

In a further subsidiary aspect, said laminate incorporates a third conductive panel and a fourth conductive panel enclosing a second portion formed primarily of PCM; and a corrugated thermally conductive panel located between said second and third conductive panels.

In a further subsidiary aspect, said laminate incorporates a plurality of projections on said panels.

In a further subsidiary aspect, said thermally conductive panels are selected from the group comprising aluminium based material, steel based material, and plastics material.

In a further subsidiary aspect, said PCM is selected from the group comprising a salt, a salt based hydrate, a mixture of salt, and/or salt based hydrate, and/or an organic material.

In a further subsidiary aspect, said salt based hydrate are selected from the group comprising hydrated calcium chloride or hydrated sodium sulphate.

In a further subsidiary aspect, said salt based hydrate incorporates a thickening agent selected from the group comprising Xanthan and/or Laponite.

In a further subsidiary aspect, said organic material is paraffin based.

In a further subsidiary aspect, said thermal conductors incorporate a conductive compound mixed into said PCM.

In a further subsidiary aspect, said thermal conductor is a carbon based compound mixed into said PCM.

In a further subsidiary aspect, said carbon based compound is carbon black.

In a further subsidiary aspect, said thermal conductors incorporate wire wool or chemical carbon nanotubes.

Modules and/or arrangements and/or PCM packs substantially as herein described and/or illustrated in any appropriate combination of the accompanying text and/or figures.

BRIEF DESCRIPTION OF THE FIGURES

FIGS. 9A and B show a PCM pack incorporating a thermally conductive corrugated plate.

FIG. 10 shows in perspective view the assembly of a PCM pack with a corrugated plate with a plurality of holes.

FIG. 11 shows a perspective view of the assembly of a hexagonal array.

FIG. 12 shows a perspective view of the assembly of a PCM pack with a hexagonal array with perforations.

DETAILED DESCRIPTION

Figure 1:
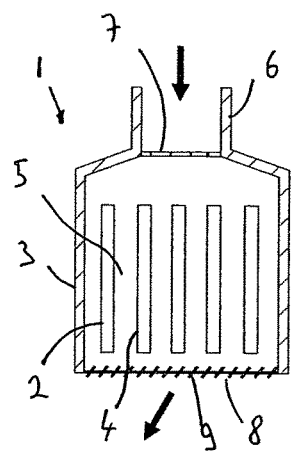
FIG. 1 shows a cross sectional view of a PCM module with a single upper opening.

FIG. 1 shows a transportable PCM (phase change material) module with a plurality of PCM packs such as PCM pack 2. The PCM packs are secured to a module housing 3. The PCM packs are provided side by side and parallel to one another. Between two neighbouring packs such as pack 2 and pack 4, there is provided a channel 5 through which an appropriate fluid may circulate. The fluid may be a gas or a liquid, however in preferred embodiments of the invention the fluid is selected to be a gas. The housing 3 incorporates a neck 6 forming an inlet/outlet to the housing. In this description the terms inlet/outlet are to be understood as interchangeable since as soon as the direction of flow is changed the inlets become outlets and vice versa. The module incorporates a valve or damper 7 for restricting the flow of gas which would typically be air through neck 6. In a system where multiple modules are employed in a network, damper 7 may be used to balance the flows to cope with differences in pressures in a given network configuration. At the opposite end of module 1, a vent 8 is provided with a number of blades such as blade 9 which is typically mounted to housing 3 in order to allow manual and/or automatic adjustment of the angle at which air would exit the housing. Housing 3 may have relatively high insulation properties so as to effectively create a thermal barrier between the PCM packs located in the housing and the housing's surrounding environment.

Figure 2:
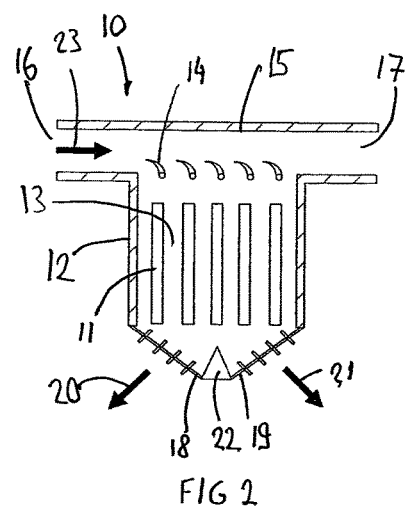
FIG. 2 shows a cross sectional view of a PCM module with two upper openings and two lower openings of differing directions.

FIG. 2 shows a further embodiment of a PCM module. PCM module 10 incorporates a plurality of PCM packs such as PCM pack 11. The module incorporates a housing 12 with releasable attachment means for securing the PCM packs in spaced apart configurations in order to provide channels such as channel 13 between neighbouring packs. A number of turning valves such as turning valve 14 are provided above the PCM packs' array in order to control the flow. Integral with the housing 12, there is provided a duct portion 15 with a first lateral opening 16 and a second lateral opening 17. Duct 15 is shaped at said lateral openings to allow for the attachment of a duct or a further module of the kind shown in any of the embodiments of the invention. Beneath the PCM packs' array, two openings 18 and 19 are configured to allow the flow of air in two separate directions as indicated by arrows 20 and 21 which are approximately 90 degrees apart. A divider 22 is provided between openings 18 and 19 to channel the flow in the desired directions. As in FIG. 1 a number of vents are provided in the openings. These vents may be pivotable to allow a user to control the exact direction of the air. Whilst air may be drawn through the module in both directions, the embodiment of FIG. 2 shows air flowing in the opening 16 as indicated by arrow 23, passing through the channels formed between the PCM packs and out through openings 18 and 19.

Figure 3:
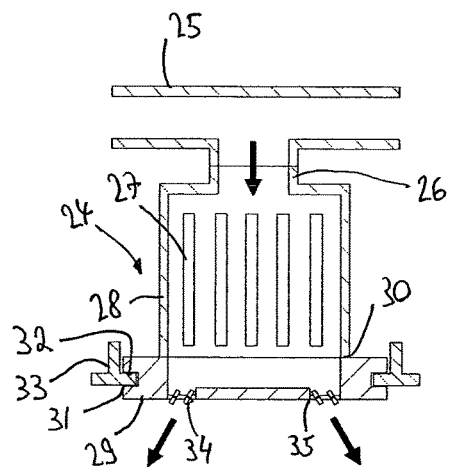
FIG. 3 shows a PCM module adapted to fit to a false ceiling.

FIG. 3 shows a further PCM module generally referenced 24 with a separable duct 25 sealed to the module's upper opening 26 which is neck shaped. The module 24 incorporates an array of PCM packs such as pack 27 arranged in a parallel configuration within an insulative housing 28. A false ceiling tile 29 is sealed to bottom opening 30 of PCM module. The false ceiling tile 29 incorporates lateral grooves 31 corresponding in shape to tongue 32 of a false ceiling frame member 33. A number of openings 34 and 35 are provided to allow air circulating from duct 25 through PCM module 24 to exit the ceiling tile into the area beneath the ceiling tile.

Figure 4:
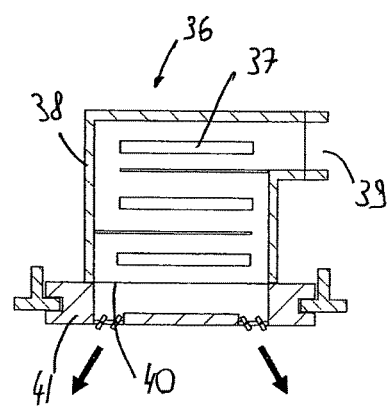
FIG. 4 shows a PCM module in cross section adapted to be fitted to a false ceiling with the PCM packs provided in series.

FIG. 4 shows a PCM module generally referenced 36 with an array of PCM packs such as pack 37 located in a housing 38. The housing incorporates a lateral opening 39 allowing the circulation of air to and/or from module 36. The PCM packs are provided in series in a path between opening 39 and opening 40. Module 36 is located against ceiling tile 41 in order to allow the flow of air through the false ceiling tile to the area beneath the tile. An arrangement of pivotable and/or adjustable vents are provided to allow a user to control and interact with them as appropriate. The ceiling tile is attached to false ceiling supports as described with reference to FIG. 3. The configuration of the figure provides for a longer air flow path in a heat exchanger when compared to the previous embodiments.

In each of the preceding PCM modules, it is preferred and particularly advantageous for there to be no active components for example for driving the flow of air. A separate module or control module is described subsequently.

Figure 5:
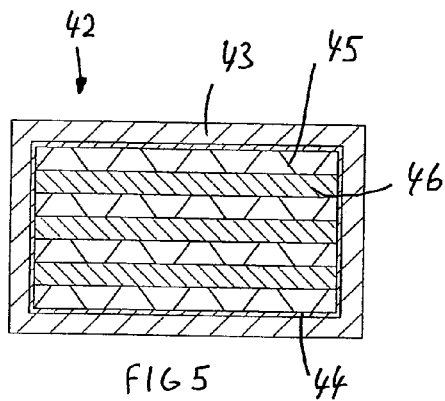
FIG. 5 shows a heat exchanger in cross section with a plurality of PCM packs separated by corrugated plates.
Figure 6:
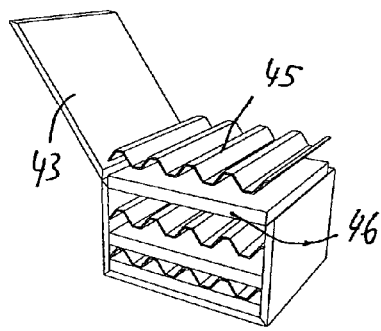
FIG. 6 shows an exploded view in a perspective of the embodiment of FIG. 5.

FIG. 5 shows a PCM module in cross-section which takes the form of a heat exchanger 42 with an insulative housing 43. The housing wall may be selected to hold 80 to 90% of the "coolth" over 8 hours. It may be of approximately 25 mm in thickness with a conductivity of 0.01 to 0.02 W/MK. On the inside of housing 43, a conductive metal frame 44 forms a lining. A succession of layers of corrugated plates such as plate 45 alternate with PCM pack layers such as layer 46. FIG. 6 shows the components of FIG. 5 in an exploded view. The corrugated plate may instead be replaced by a number of transverse fins or links which in a similar fashion as the corrugated plate would increase the surface area in contact with air flowing through the channels left between the PCM packs. Since the surface area in contact with air is increased, the PCM packs may be thicker thus allowing greater cooling to be achieved. In a preferred embodiment, the gap between the PCM packs is slightly smaller than the height of the corrugated fins to ensure optimum thermal contact. In order to support the weight of the PCM packs, there is provided rails on the inside of the frame (not shown in the figures).

Figure 7:
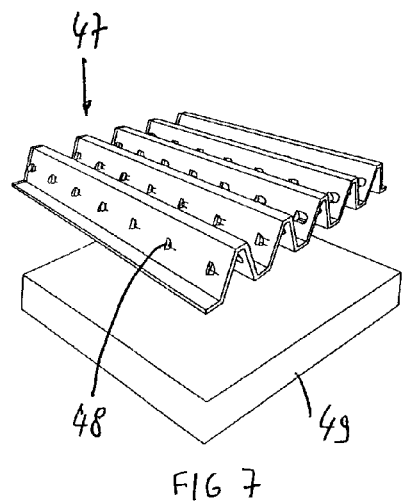
FIG. 7 shows in perspective view the combination of a PCM pack with a corrugated plate.

FIG. 7 shows a corrugated plate 47 with a number of projections such as projection 48. Alternatively, these projections may be holes or a combination of holes and projections in order to break up laminar flow by creating turbulence in order to increase heat transfer. The corrugated plate 47 may be disposed as shown in FIG. 5 adjacent to a sealed PCM pack 49. The corrugated plate 47 may preferably be made of sheet metal preferably less than 1 mm thick. For optimum structural strength and thermal conductivity, a range of 0.1 to 0.2 mm is envisaged. A number of known techniques are envisaged to form the plate such as pressing or folding. Instead of employing sheet metal, a thermally conductive plastics material may also be selected.

Figure 8:
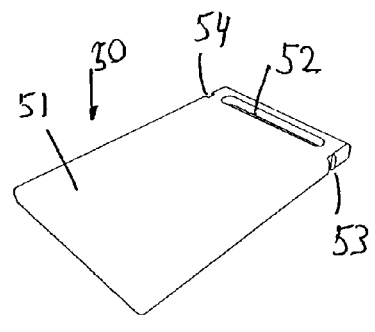
FIG. 8 shows in perspective view a portable PCM pack.

FIG. 8 shows a PCM pack 50 with an impermeable outer layer 51 for containing the PCM. A handle 52 is provided which may take the form of an oblong opening. A number of recesses 53 and 54 are provided on opposite lateral sides of the pack. These may be employed in order to lock the pack into releasable attachment means provided in a heat exchanger for example. This embodiment illustrates how the PCM pack may be rendered readily portable.

FIG. 9A shows a PCM pack formed with an upper wall 55 and a lower wall 56 for trapping PCM. Between walls 55 and 56, there is provided a plate 57 formed as a succession of V-shaped portions when viewed in cross-section. The components of FIG. 9A are shown in FIG. 9B as glued or sealed together in order to prevent any escape of PCM during use.

The PCM is one of an organic, a salt based hydrate, or a combination of both. A paraffin based PCM is envisaged with a melt temperature preferably within the range of 21 to 24 degrees Celsius. In order to achieve an optimal melt temperature, the different types of available paraffins are mixed in the appropriate proportions.

Salt hydrates which are suitable for use may for example be hydrated forms of calcium chloride or sodium sulphate. The invention also envisages employing a thickening agent as an addition to the salt hydrates to maintain the salt in its hydrated form. Suitable thickening agents may be selected from the group comprising: Xanthan or Laponite. In addition to the transverse conductive fins of the corrugated plate 57 or instead of such transverse fins, a conductive element may be suspended in the mixture of PCM. An appropriate compound for suspension may be carbon black.

FIG. 10 shows an alternative construction of a PCM pack generally referenced 58. The configuration of the PCM pack differs from the preceding embodiment in that a number of holes 59 are provided in the fins 60 of the corrugated plate generally referenced 61. Such holes allow molten PCM to distribute evenly and to keep air out. The corrugated panel may be glued to improve strength.

The corrugated panels may be pressed and mainly made of very thin wall thicknesses such as less than 1 mm in order to keep weight to a minimum whilst the profile/ridges/pattern adds a strength. The transverse fins allow the thickness of the PCM pack to be increased by improving conductivity. It allows the KM to be at an optimal maximum distance of between 4 to 16 mm (or 10 to 20 mm) from the links throughout the pack. Alternative thermal conductors are envisaged to be located in the PCM such as wire wool, chemical carbon nano-tubes, suspended carbon black which may be randomly distributed throughout the material.

The transverse links may be made of thin metal/plastic which would preferably be less than 1 mm in thickness. The shape and configuration of the plate may be obtained by pressing, stamping and/or folding processes.

FIG. 11 shows a PCM pack 62 in an exploded view with an array of closely contiguous cylinders 63 for receiving PCM. The cylindrical tubes may take the form of a hexagonal mesh. The array may be formed from a single sheet which is laser cut and pulled apart to result in an array with walls of a thickness of approximately 0.1 mms. Secured to the top and bottom of the array, there is provided top and bottom plates respectively referenced 64 and 65. The process of assembling may incorporate the following steps: a) attaching the array of hexagonal receptacles to one of the top or bottom plates, b) filling the tubes with PCM in its molten phase allowing sufficient clearance for its expansion as it freezes before c) gluing to attach the remaining panel.

An alternative PCM pack 66 is shown when compared to the embodiment of FIG. 11. PCM pack 66 incorporates a shallow walled plateau 67 into which an array of hexagonal receptacles 68 is located. The array of receptacles is sealed between lid 69 and plateau 67. Holes such as hole 70 are provided through each of the hexagonal receptacles in order to allow PCM to distribute. The panel 69 may be attached to the plateau 67 by ultrasonic welding or by gluing.

If the PCM is selected to be salt based the material for the pack is preferably selected to be a coated aluminium or a conductive plastics material (for example K greater than 5 W/MK) or stainless steel in order to prevent corrosion.

One of the key advantages of transverse links is that it allows PCM packs to be made of a greater thickness than would otherwise be possible. For example packs with material thicknesses of 20 to 50 mm may be achieved with effective conductivity.

Figure 13:
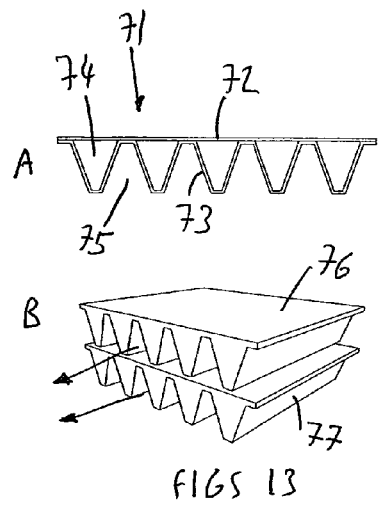
FIGS. 13A and B show in cross section and in perspective view PCM packs incorporating a corrugated wall.

FIGS. 13A and 13B a PCM pack (FIG. 13A) and a stack of PCM packs (FIG. 13B). In this embodiment, the PCM pack is generally referenced 71 and is formed only of two plates 72 and 73 allowing for the filling of PCM in an array of cavities such as cavity 74. The cavities are formed in cross-section in a V-shape. The portions such as portion 75 would be exposed to air flow. In addition, it is envisaged for the external surface exposed to the flow to incorporate knurling and/or bumps. This kind of relief may be used in any of the preceding embodiments in order to increase the flow turbulence and therefore the heat transfer properties of the pack. The undulated or corrugated plate 73 is formed for example by pressing or folding. As indicated in the stack of packs 76 and 77 air may flow in the cavities provided as indicated by the arrows. This embodiment allows an increase in surface area in contact with the air and a reduction of the maximum distance between the PCM and the conductive material. In other words, it combines the function f the PCM packaging with the transverse links inside as well as the corrugated heat exchanger in touch with the air.

Figure 14:
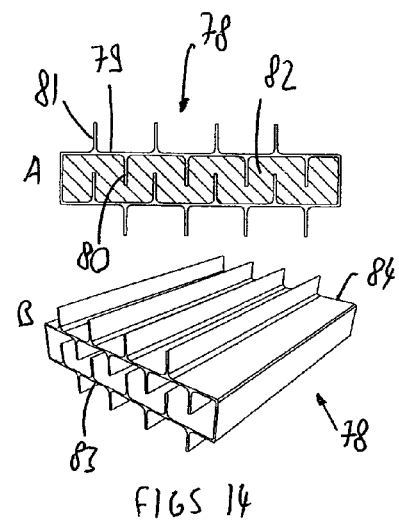
FIGS. 14A and 14B show respectively in cross section and in perspective a PCM pack whose envelope may be formed by extrusion.

FIGS. 14A and 14B show a PCM pack 78 in two separate views. The PCM packs 78 incorporate a single peripheral wall 79 with a number of inwardly projecting webs such as web 80 and outwardly projecting webs such as web 81. In other embodiments only externally projecting webs may be provided and/or only internally projecting webs. Within the envelope formed by peripheral wall 79, PCM 82 is placed to fill the space. In order to enclose the PCM pack, end pieces (not shown in the figures) may be provided and secured onto lateral edges 83 and 84. The materials used for these PCM packs may be a relatively low permeable plastics material. Alternatively, coated aluminium is also advantageous. Preferably, a conductive of plastics material would be selected with a thermal conductivity factor greater than 1 W/MK. An option of achieving this kind of conductive of plastics material for the PCM pack material would be to add carbon nano-tubes or particles to the plastics material. The process envisaged in order to produce wall 79 would be to form the wall by extrusion.

Figure 15:
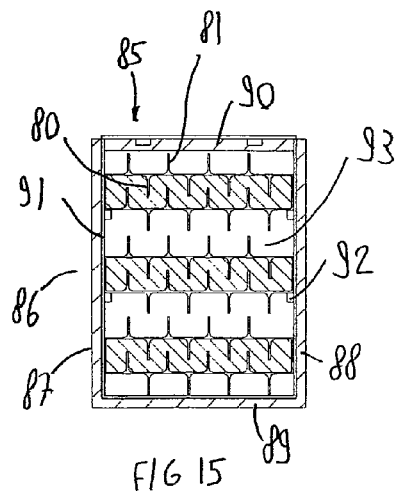
FIG. 15 shows a perspective view of a heat exchanger incorporating a number of PCM packs of the kind shown in FIG. 14.

FIG. 15 shows a PCM pack module generally referenced 85. Module 85 incorporates an insulative outer layer 86 formed by side walls 87, 88, a base wall 89 and a lid 90. Within the insulation, there is provided a frame 91 with a number of ledges such as ledge 92 for supporting a stack of PCM packs in a spaced apart relationship. Gaps such as gap 93 are provided to allow the circulation of fluid. The links 80 and 81 extend in this embodiment only partially towards a neighbouring PCM pack plate.

Figure 16:
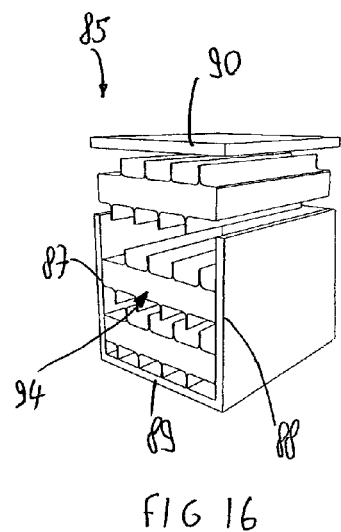
FIG. 16 shows a perspective view of a heat exchanger incorporating a number of PCM packs of the embodiment of FIG. 14.

As shown in FIG. 16, during assembly, a side 94 may be fully open in order to allow the insertion of the successive packs in similar fashion to a drawer sliding into its case.

Figure 17:
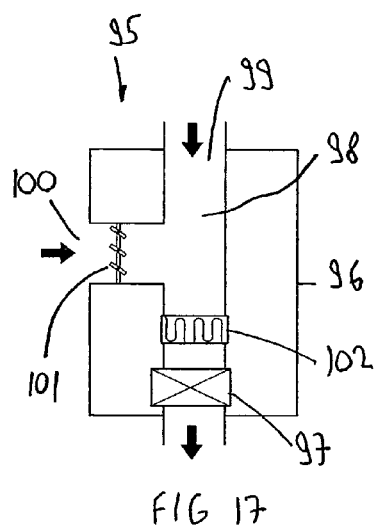
FIG. 17 shows a schematic cross sectional view of a control unit with a lateral valve.

FIG. 17 shows a control module generally referenced 95. The control module may be employed in communication with a number of PCM modules which may be of the kind described in the previous embodiments. The control module 95 incorporates it own housing 96 which contains a fan 97 causing the circulation of air as shown in the figure by the arrows. In an alternative embodiment, the fan may be driven in an opposite direction. The control module incorporates an inlet duct 98 which is split between a first opening 99 and a second opening 100. The first and second openings are located on different sides of the housing 96. In a particular configuration, the module may be placed within a building in order to draw air in from the room through opening 100 and to draw air in from outside or fresh air from an appropriate source through opening 99. Within opening 100 a valve and/or a vent and/or a sliding door 101 may be provided to regulate the proportion of air drawn from within the room with the proportion of air drawn from outside or from a fresh source of air. Optionally, a filter 102 is provided upstream from the fan.

In addition to these components, there may be provided circuitry for controlling the operation of the fan. The circuitry may be in communication with one or more sensors or monitors which monitor carbon dioxide and/or room temperature. Appropriate sensors may be provided within a room or outside of a room. In addition sensors or monitors may be provided to assess the PCM exit temperature where appropriate. In a preferred embodiment, the sensors may be configured to assess the electrical resistance of PCM to determine the amount of cooling remaining in a given pack.

Figure 18:
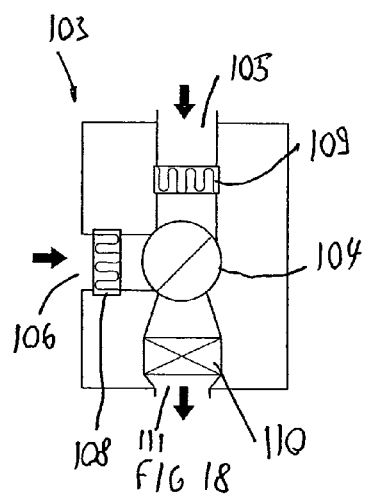
FIG. 18 shows a schematic cross sectional view of a control module with a valve located between two inlets.

FIG. 18 shows an alternative module generally referenced 103 with a control valve 104 located between first opening 105 and second opening 106. Optimally a number of filters 107 and 108 are provided downstream from openings 105 and 106. The duct beneath the valve 104 may be configured to widen out towards fan 110 leading to opening 111.

Figure 19:
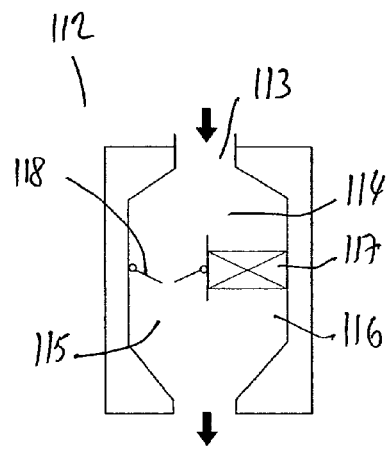
FIG. 19 shows a schematic cross sectional view of a control module employing a non-return valve.

FIG. 19 shows a further embodiment of a separable control module 112. This control module incorporates an opening 113 for drawing in air from a room or from outside. The duct 114 is split into two paths 115 and 116 which are respectively fitted with a fan 117 and a non-return valve 118. This allows an external forced air system to be used since the non-return valve allows the air to bypass the fan. If re-circulated air from the room is required then the fan is operated creating a high pressure in order to draw the air through.

Figure 20:
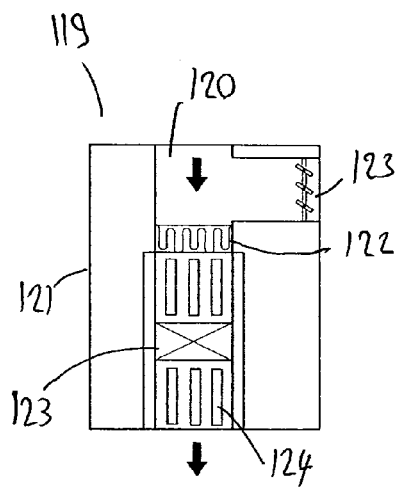
FIG. 20 shows a control unit incorporating a fan.

FIG. 20 shows a further separate control module 119 with an upper opening 120 in a housing 121. It optimally incorporates an air filter 122 downstream from opening 120. A lateral opening 123 is provided with a vent. Around the fan 123 there are provided baffles such as baffle 124 which provide sound insulation. In this embodiment, the simple vent 123 can open/close—this is because the air from outside has further to travel than when the vent is open. There is less resistance and more air is re-circulated. As the vent closes it creates more resistance so a smaller proportion of air is taken from inside. In practice, the vent may have greater cross-sectional area for example up to twice the area of the fresh air duct which incorporates opening 120.

Figure 21:
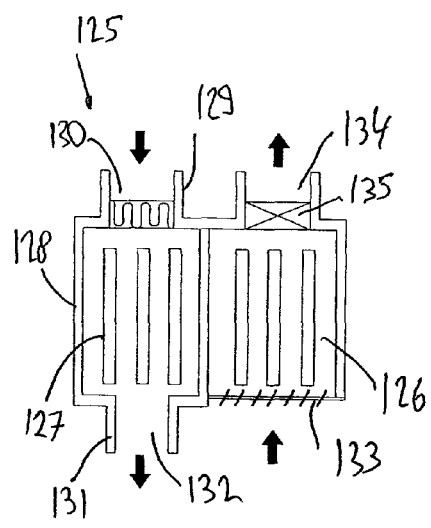
FIG. 21 shows a schematic cross sectional view of a heat exchanger which may be used in conjunction with a PCM module.

In addition to the PCM module and the control module a further module may be provided. In a preferred embodiment, the backup module would be provided upstream from the PCM module. FIG. 21 shows a backup module 125 which incorporates a heat exchanger with a hot side 126 and a cold side 127. Cooling liquid may for example circulate between the hot and cold side. Housing 128 incorporates a duct 129 suitable for connection to a further duct or a further module. An opening 130 is provided to allow air in from inside and/or outside. The control module of the kind described in FIGS. 17 to 20 may be used to cause the flow of air through the cold side 127 of the heat exchanger. An exit duct 131 is provided with an opening 132 to allow air to circulate towards a PCM module. An opening 133 allows air which may be for example stale room air to circulate through the hot side of the heat exchanger and towards opening 134. A pump 135 or a fan is employed to draw the air through in the direction shown in the figure.

Figure 22:
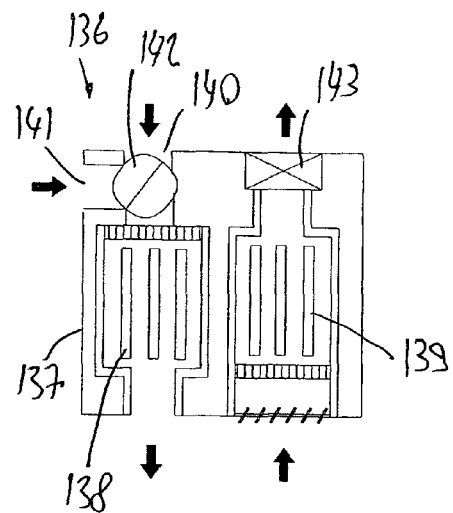
FIG. 22 shows a schematic cross sectional view of a further embodiment of a heat exchanger.

FIG. 22 shows a further backup module 136 with a housing 137 accommodating a hot and cold side of a heat exchanger. The cold side is referenced 138 and the hot side is referenced 139. Two openings 140 and 141 are provided on either side of a valve 142. Fan 143 powers air out of a room to remove heat from the hot side. The backup module may incorporate a heat pump and/or an inverter and/or a pettier cooler in order to cool air going to a PCM module with waste heat taken away. Alternatively, an evaporative arrangement may be used where the hot side would become an evaporator cooler and enables the wet waste air to be removed whilst "coolth" is transferred to incoming air.

A number of advantages arise from combining a module of the kind described in FIGS. 21 and 22 with a PCM module as described previously, it allows the backup modules to be kept compact as compared to a conventional heat exchanger only system. It is also particularly advantageous since it allows operation during night time when the heat exchanger is in any event more efficient. There is therefore particular energy savings for evaporative, heat pump and/or pettier cooling systems. It also allows the use of nighttime electricity which is cheaper. The module arrangements allow for the backup unit to be specified separately to the PCM and control system to suit the local climate and heat loading of the room. It also allows easier maintenance.

The backup system may ideally be controlled so that it enters a night freezing mode if the temperature assessed by the control module is not cool enough then it would turn on the backup system to freeze the PCM. In this configuration, the heat pump is virtually not required during the day time since by combining the PCM module and the backup module during the night cycle most of the cooling is achieved.

Figure 23:
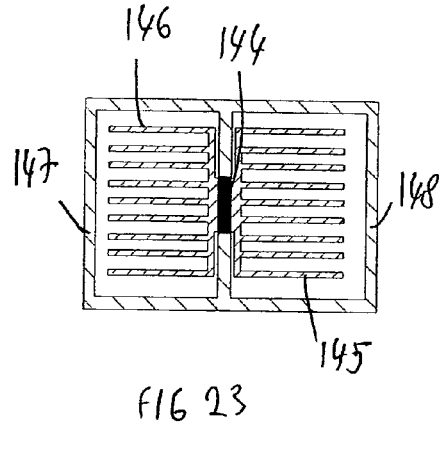
FIG. 23 shows a cross sectional view of a heat exchanger incorporating a pettier cooler.

FIG. 23 shows in further detail how a pettier backup module may be formed. A pettier may be located between its hot side 145 and its cold side 146. A cold side duct 147 and a hot side duct 148 are provided. As in the previous embodiments, the cold side duct may be in communication with a PCM module. Insulation is provided as a wall for the ducts.

Figure 24:
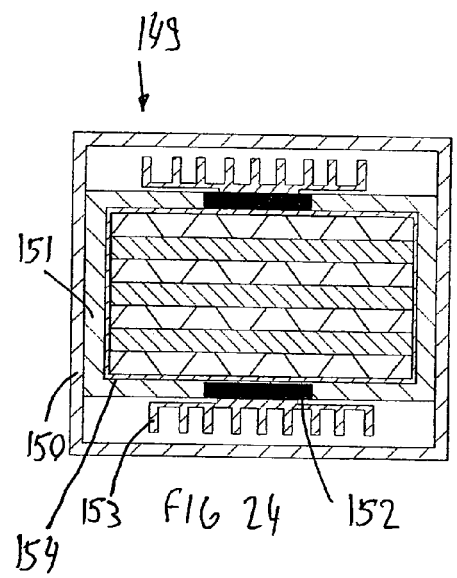
FIG. 24 shows a heat exchanger in cross sectional view incorporating PCM packs.

FIG. 24 shows a further PCM module 149 with an outer housing 150 and an inner housing 151. One or more peltiers are provided such as pettier 152. The pettier 152 has a hot side 153 provided in a duct through which air is drawn. Within housing 151 there is provided a conductive frame 154 in which layers of corrugated plates and PCM packs alternate as in for example FIG. 5. PCM module acts as the cold side of the heat exchanger as well as incorporating the PCM packs. One of the benefits of this configuration is that it is particularly compact.

Figure 25:
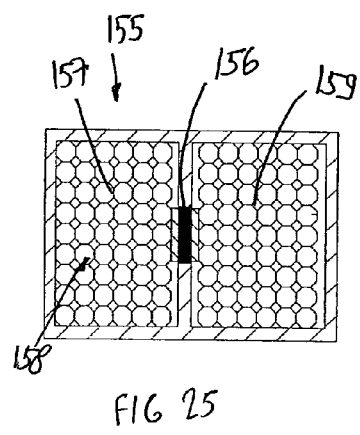
FIG. 25 shows in cross section a heat exchanger incorporating hexagonal ducts as part of a pettier cooler.

An alternative to the embodiment of FIG. 23 is shown in FIG. 25 where a further pettier based backup module 155 is shown. The pettier 156 incorporates a mesh of hexagonal tubes such as tube 157. The hexagonal arrays each form a side of the heat exchanger. In this embodiment, side 158 is a cold side whilst side 159 is a hot side. The cool side 158, in use, may be in communication with a PCM module for backup cooling when necessary. The hexagonal configurations form a relatively light weight configuration due to the wall thickness. Improved thermal conductivity is also achieved due to the high surface area it provides.

Figure 26:
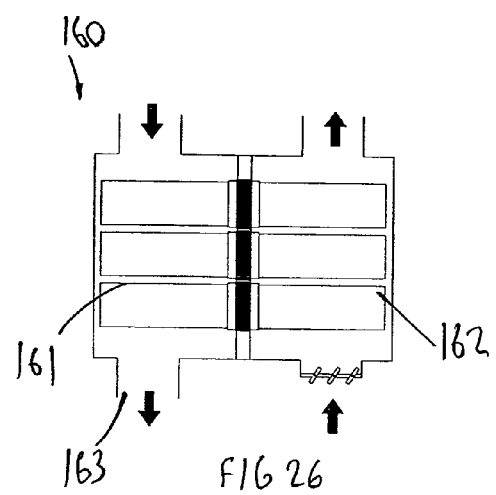
FIG. 26 shows a control unit incorporating a number of heat exchangers.

FIG. 26 shows a further backup module 160 with one side in communication with a PCM module and/or a room and a second side 162 through which air is drawn and forced out by a fan (not shown). The module incorporates three peltiers located in a series. Advantages exists from incorporating two or more arrangements in series. The air circulation is similar to the preceding embodiments where a duct 163 may be in communication with a PCM module and/or a room.

It is preferred to use an insulated housing for a heat pump or pettier backup system to separate the hot and cold sides. In an evaporative cooler the two chambers are preferably thermally connected to transfer the cold from the wet to the dry side.

Figure 27:
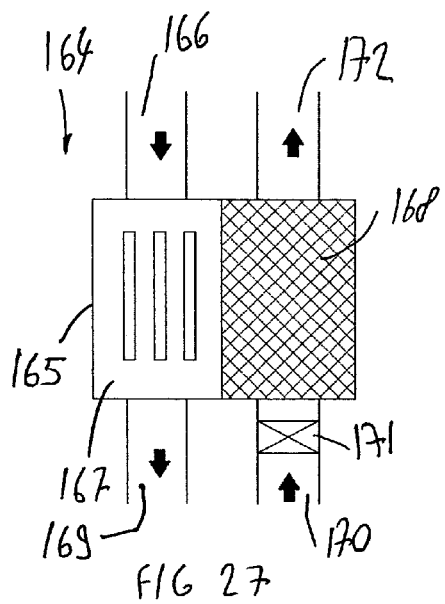
FIG. 27 shows a schematic cross sectional view of a backup module incorporating an evaporative unit.

FIG. 27 shows an evaporative cooler module generally referenced 164. The module 164 creates a housing 165 with a first opening 166 through which air may be drawn. Housing 165 incorporates two adjacent chambers 167 and 168. In chamber 167 a heat exchanger array transfers the "coolth" from the evaporative chamber to the incoming air. A second opening 169 is provided to allow air to exit—this may be cool air which is then channeled to a PCM module or to the room. In chamber 168, a mesh or wicking is envisaged for the evaporative cooler. Air is drawn in through opening 170 due to the action of fan 171. The air exits as wet air through opening 172.

Figure 28:
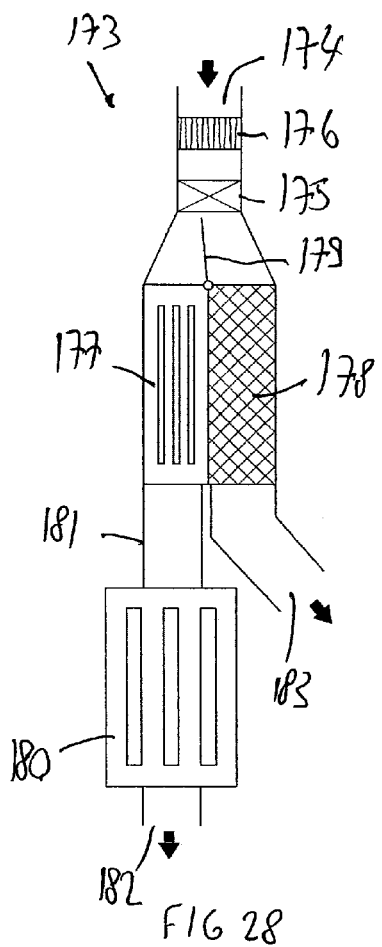
FIG. 28 shows a further embodiment of a backup unit with an evaporative system.

FIG. 28 shows a further evaporative cooler module 173 with a first opening 174 though which air is drawn in. A fan 175 and a filter 176 are provided downstream from the opening 174. A heat exchanger 177 and an evaporative cooler 178 are located side by side. The air drawn in through opening 174 is split by a splitter or a valve 179 which controls the amount of air going to either the evaporative cooler 178 or to the heat exchanger. In the circumstances when the evaporative cooler is not required all the air is directed to a PCM unit 180 which is in communication with the heat exchanger 177 by a duct 181. Air exits the PCM unit to a room via opening 182. The exhaust air exits through opening 183.

Figure 29:
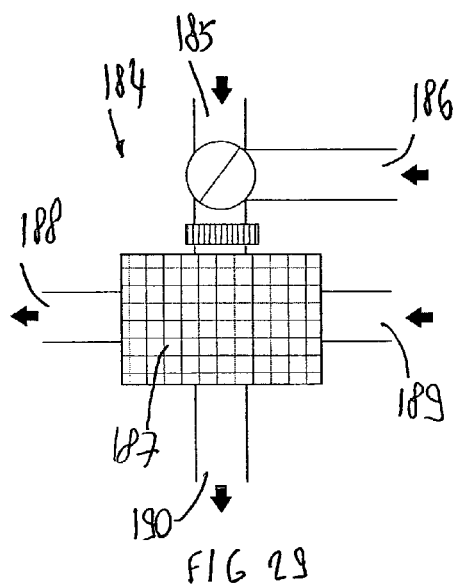
FIG. 29 shows a further embodiment of a backup unit.

FIG. 29 shows a further evaporative cooler module generally referenced 184 with a fresh air intake 185 and a secondary intake 186 which may be in communication with a room. A valve may be optionally fitted between intakes 185 and 186 to control proportions of air. If the valve is not used then the air can only be drawn from outside. A cross flow evaporative chamber 187 exhausts wet air through opening 188. Air is drawn through opening 189 whilst air to a further PCM module or to the room exits the module through opening 190.

In the preceding FIGS. 27 to 29 the evaporative chamber incorporates separate paths for the evaporative wet air used to create cooling and for the dry air taken into the room. This prevents the conditioned air and the room becoming too humid. Further examples of indirect evaporative coolers that transfer "coolth" from the wet to dry chamber are well known, see for example U.S. Pat. No. 6,581,402. Whilst the use of evaporative coolers is well known, by using them in conjunction with latent heat storage and PCM modules, the evaporative cooler can be used at night when they are more efficient and when the night air is cooler. This substantially increases the effectiveness and/or reliability of a PCM cooling module when compared to a PCM module operating on its own. The two chambers 167 and 168 are thermally connected.

Figure 30:
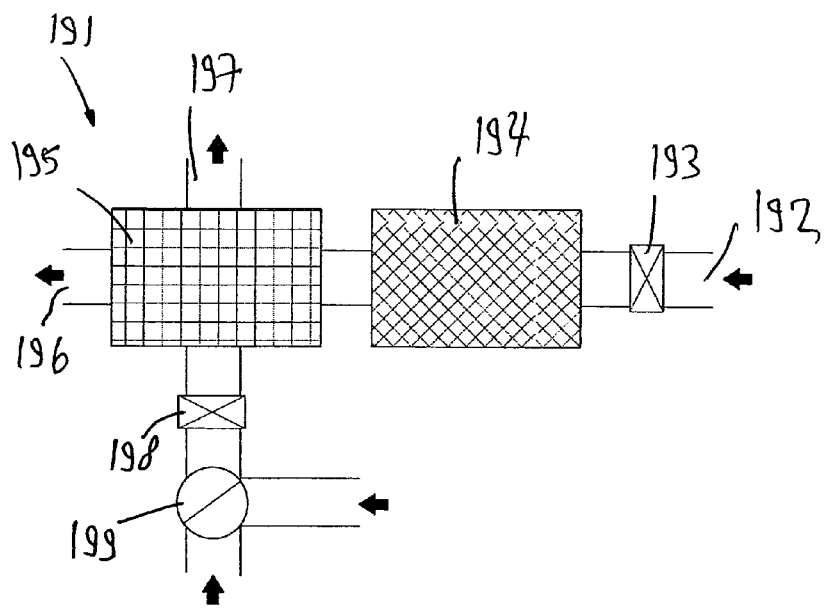
FIG. 30 shows a schematic cross sectional view of a further embodiment of the invention.

FIG. 30 shows a further evaporative system generally referenced 191. In this embodiment the air is drawn through opening 192 by a fan 193. It then flows through an evaporative chamber 194. Warm dry air goes into the evaporative chamber and cool wet air comes out. A heat exchanger 195 transfers the "coolth" from the wet exhaust air to the dry air going into the room. Opening 196 provides for the outlet of exhaust air whilst opening 197 provides for the cool dry air to room. A second fan 198 draws fresh air from outside or separately sourced fresh air through the system. Valve 199 which is again optional allows the proportions between air drawn from outside and air drawn from the room to be regulated.

Figure 31:
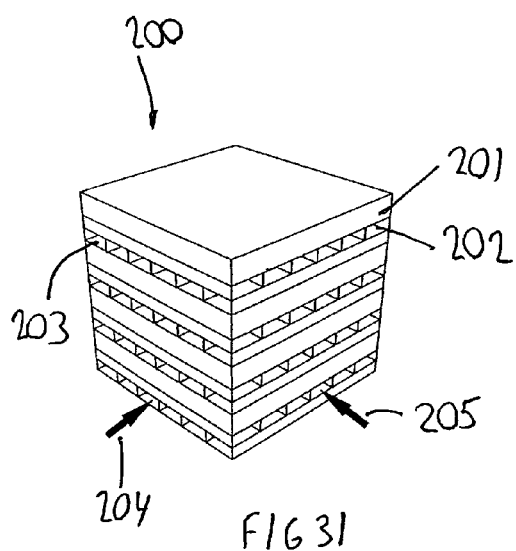
FIG. 31 shows a PCM pack laminate with bi-directional channels in perspective view.

FIG. 31 shows a combined PCM and evaporative module 200. The laminate of PCM and air channels is formed in Layers of in succession a PCM pack 201, a layer of air channels in a first direction and a layer of air channels in a second direction 203. One of the directions is for dry air and is indicated by arrow 204 whilst the second direction is for wet air as indicated by arrow 205.

The heat exchanger of FIG. 30 may also incorporate a PCM/evaporative arrangement of the kind shown in FIG. 31.

Figure 32:
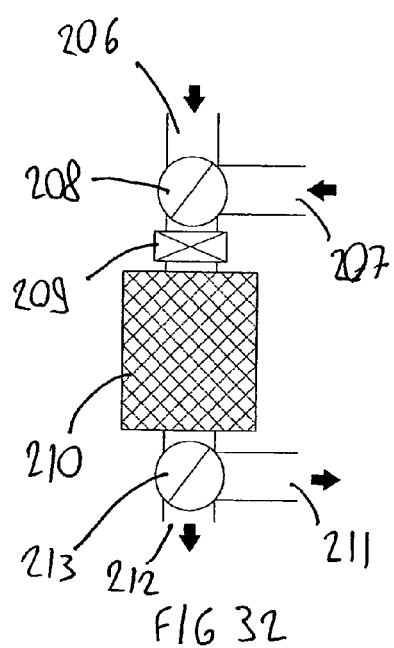
FIG. 32 shows a further evaporative system in schematic cross sectional view.

FIG. 32 shows a further PCM/evaporative arrangement where fresh air flows through opening 206. Optionally, a second opening 207 is provided to allow air in from the room. An optional valve 208 is provided between the two openings. A fan 209 draws the air through the arrangement. A combined PCM and evaporative chamber 210 is located downstream from the fan and exits either outside through opening 211 or into room through opening 212. A valve 213 is provided between the two openings 211 and 212.

Figure 33:
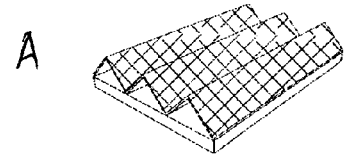
FIG. 33A and FIG. 33B shows a perspective view and a cross sectional view of a plate and PCM pack combination.
Figure 33:
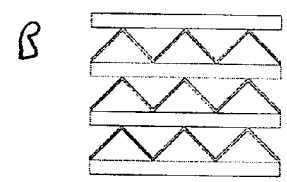

FIG. 33A show a further embodiment of a heat exchanger with a PCM pack and an evaporative cooler. The heat exchanger as shown in FIG. 33B may be built from a stack of combined heat exchanger and a PCM pack. It is envisaged that the PCM pack layer thickness would be greater than that illustrated. The heat exchanger may be formed as a corrugated arrangement with conductive wicking on its surface. These may be knurls on an aluminium plate.

The advantages of the combined PCM and evaporative modules are that they are more compact than the side by side combinations of such modules. At night, air is taken from outside, circulated over the PCM. If the air is not cold enough then water is added so that the evaporation provides additional cooling. The wet air is dumped outside as the PCM packs are frozen. During the day the cooling is provided by the PCM whilst no water is added and air is simply taken inside.

The heat exchanger is preferably conductive for example a metal, a conductive plastics material or a composite to increase the surface area in contact with the air to increase the heat transfer when the PCM is working. It also acts as a wicking to create a fine layer of water over it as it breaks down surface tension. In order to achieve this, grooves, channels and/or knurling on the metal surface or another form of mesh, fabric, or wicking may be envisaged.

The control system consists of a microcontroller and sensors to measure the time and temperature. Preferably the temperature in the room, the temperature or electrical resistance of the PCM and the outside temperature are measured.

When the outside air temperature has dropped, or the timer indicates it is the coldest time of the night, cool air from outside is pulled over the PCM. A temperature sensor in the PCM, or a measure of the electrical resistance of the material, tells the control system whether it is frozen or has reached the desired temperature. The PCMs typically exhibit low electrical resistance when liquid and high electrical resistance when frozen.

During the day the system circulates air over the PCM to provide cooling either when the temperature rises above a certain level or when the user requires it. Preferably a timer is provided to allow the user to set when the system is to be active. If the outside air is cooler than the inside air then a greater proportion of the air is taken from outside.

Figure 34:
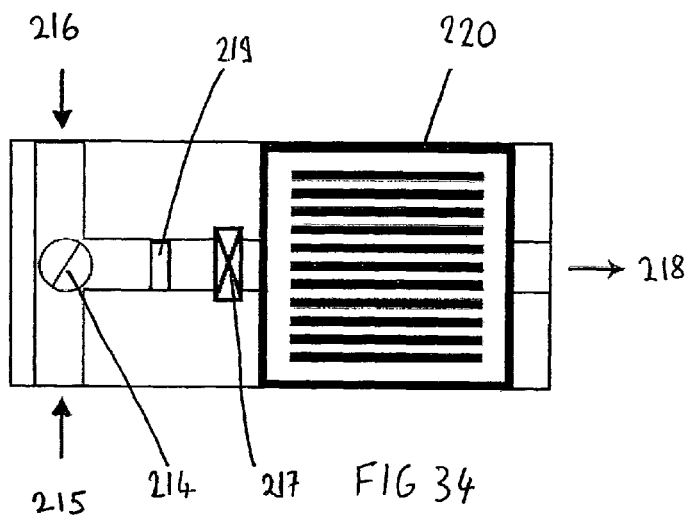
FIG. 34 shows a schematic cross sectional view of a PCM unit.

FIG. 34 shows how the unit works. A valve 214 determines whether air is taken from inside 215 or outside 216, it is then pulled through the PCM by a fan 217 and back into the room 218. Preferably a simple removable air filter 219 removes dust and particles. A layer of insulation around the PCM 220 allows the cooling energy to be stored until required.

Figure 35:
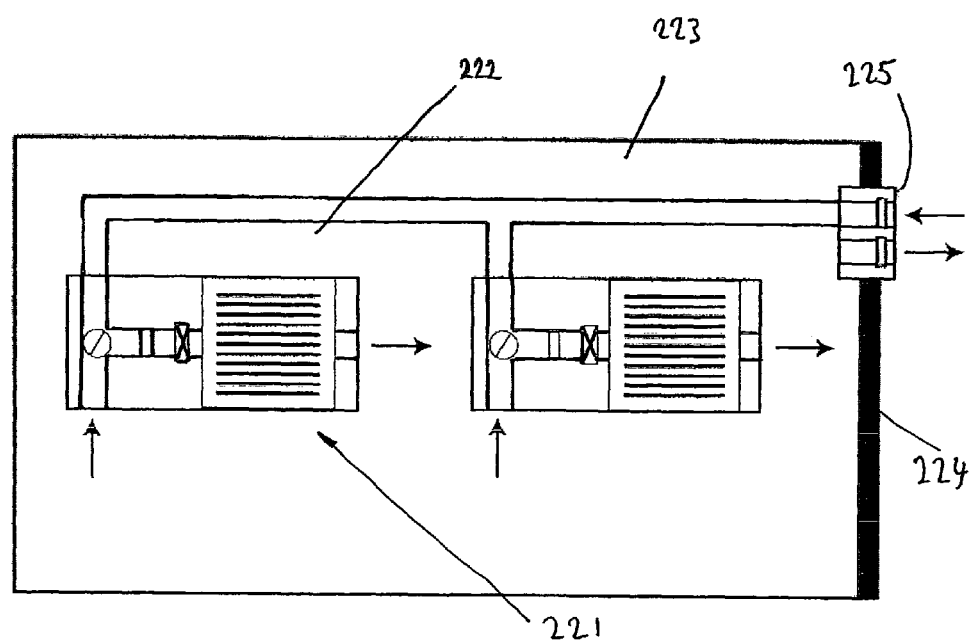
FIG. 35 shows a plurality of PCM modules.

FIG. 35 shows how one or more units 221 can be connected to the outside air through a series of ducting 222. The units are mounted inside the room 223 and the ducting connects the units to an exterior wall 224 and the outside through a hole in the wall, door or window. Preferably an additional vent or valve 225 at the wall allows excess air from inside to escape, when the air is being pulled inside through the units and an additional air filter is placed here.

The unit described previously can be mounted in a number of ways. The unit 221 can be ceiling or wall mounted, or left on the floor and moved by rollers. The units can be connected to a series of ceiling or wall mounted ducting, or by a flexible hose through a window to the outside.

Figure 36:
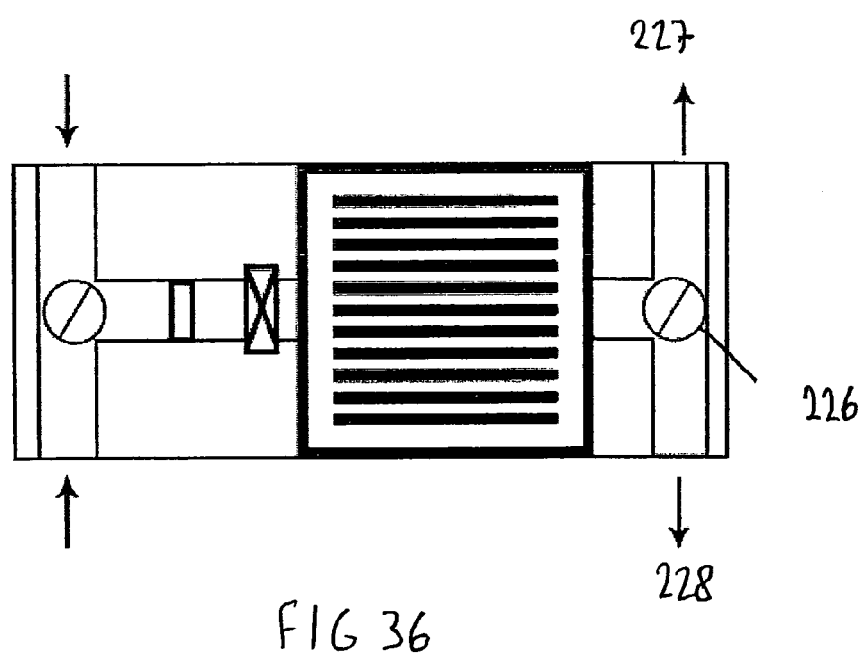
FIG. 36 shows a further embodiment of a PCM module.

FIG. 36 shows an additional valve 226 to the system described in FIG. 34. This allows the air leaving the unit to be sent outside 227 via a second duct or hose, or into the room 228. When the cool night time air is used to cool the PCM it can be returned outside should the room temperature become too low. By returning the excess air outside the room temperature can be regulated without effecting the cooling of the PCM.

The units can be combined with lighting. They may have a sound/acoustic absorbing panel fitted to the PCM module in order to absorb sound from the room. Preferably fittings are provided to attach the lights if required.

Preferably a control interface is provided that is either part of the unit or separate to it. The control interface may have a wireless, infrared or wired connection allowing it to control individual or multiple units. The control interface provides feedback to the user on how much cooling energy is remaining in the unit, as well as allowing them to activate or deactivate the units.

Figure 37:
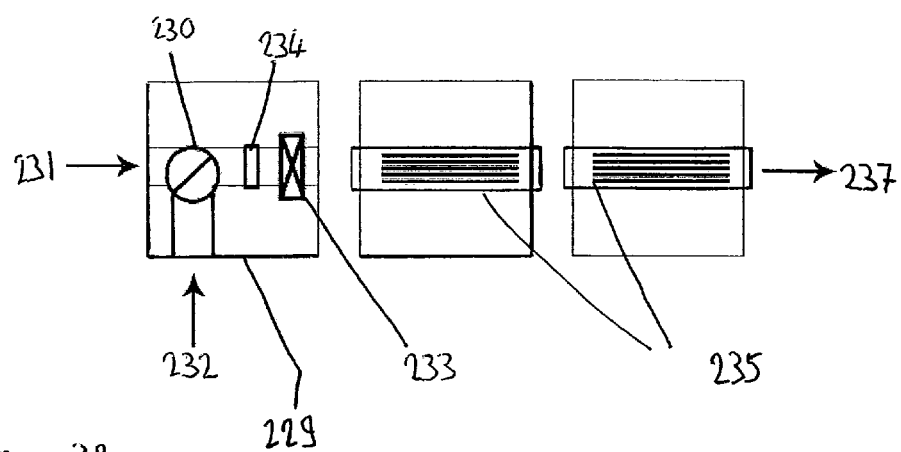
FIG. 37 shows a combination of a controlled unit, and PCM modules in cross sectional view.

A further system is shown in FIG. 37 where the PCM is mounted inside the ducting that connects to a supply of outside air. A central control unit 229 at one end contains the valve 230 to control whether air enters the units from outside 231 or inside 232, a fan 233, and preferably an air filter 234. The modules connecting to the control unit are insulated and contain the PCM 235. Air travels all the way along the duct and out the end 237.

To ensure the air does not stall the cross-sectional area for air flow will need to vary with the total length of the duct, or if the duct is split into multiple paths. This can be achieved by varying the overall diameter of the duct or by changing the density of the PCM inside the duct. For example if the resistance to the air is too great at the end of the duct then less PCM may be placed here. Valves may be placed along the length of the duct to allow air out, and balance the air flow.

Figure 38:
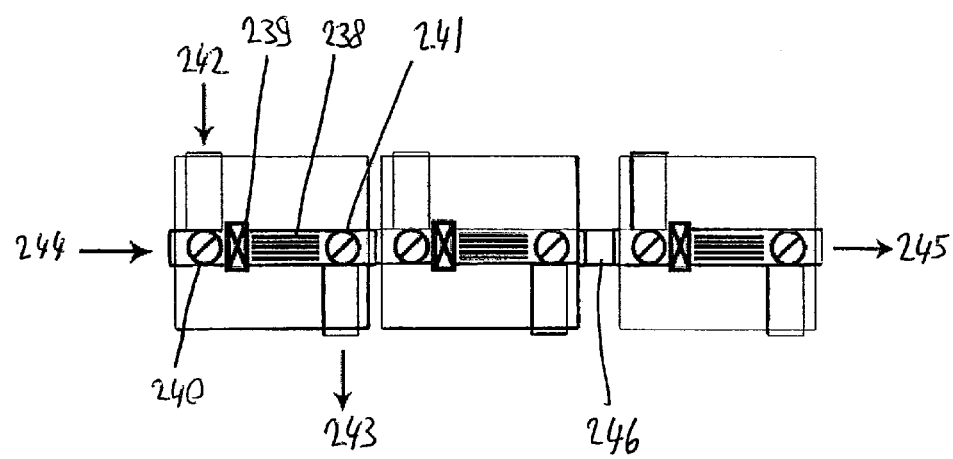
FIG. 38 shows a combination of a plurality of PCM modules.

FIG. 38 shows the PCM 238 mounted inside the duct along the fan 239. During the day the two valves 240 and 241 allow the air to pass through each unit individually, allowing air from in the room 242 and back out again. At night these valves allow air to travel along the entire length, from outside 224 and out of the last unit 245. The air is allowed into the room or the last unit is also connected to the outside and the flow into the room is controlled by the valve 241 only.

The units can be connected directly to each other or separated with additional pieces as shown by 246, which may perform additional functions such as turning a corner.

Figure 39:
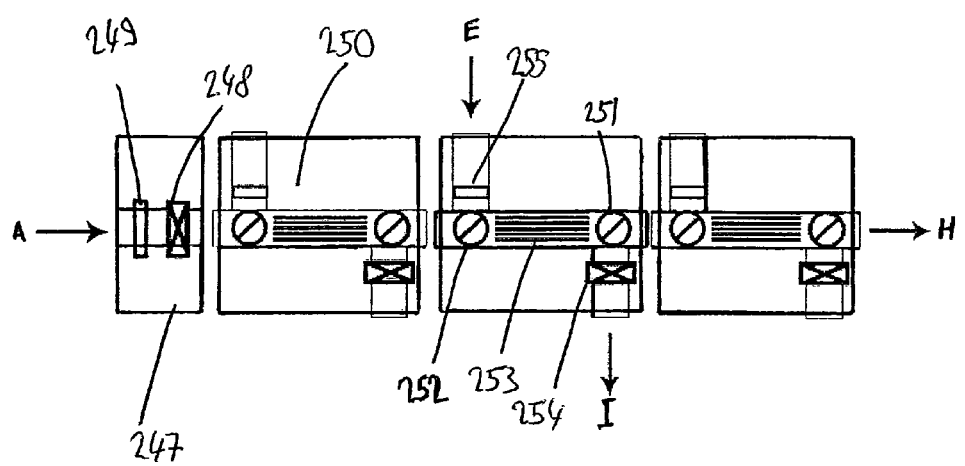
FIG. 39 shows a further embodiment of a combination of PCM modules in cross sectional view.

FIG. 39 shows a central control system 247 that consists of a fan 248 and filter 249 to push or pull night time air through the whole system (from A to H) as described. Each PCM 250 contains two valves 251 and 252 controlling the air flow so that during the day time, air is circulated through the PCM 253 individually (from E to I), via a fan 254 and filter 255.

Figure 40:
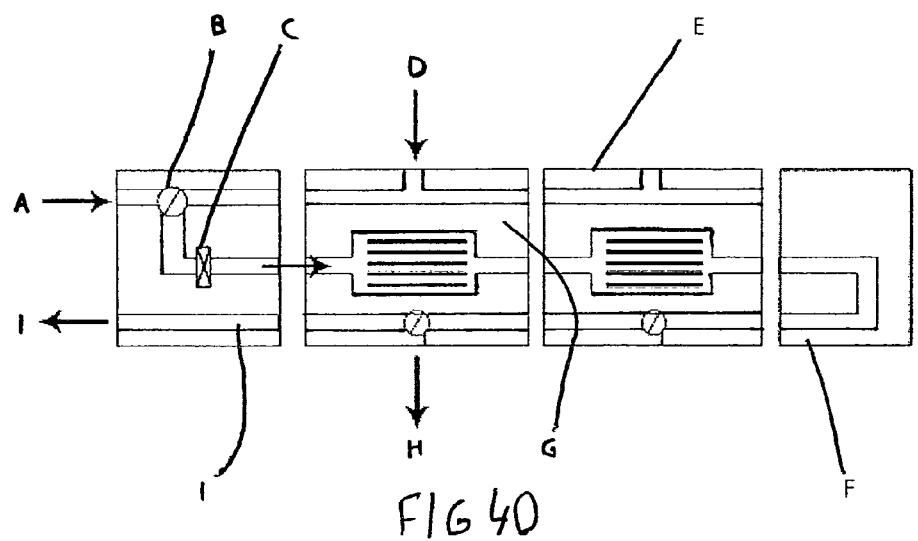
FIG. 40 shows a further embodiment of the combination of PCM modules, a control unit and a recirculation unit.

FIG. 40 shows a plurality of modules I, G, E and F located in a series. A channel is provided to bypass the series of PCM packs. A fan drawn air through the PCM packs in the PCM modules and out towards a plurality of rooms. Each outlet incorporates a valve to regulate the flow. Module F is simply a recirculation module.

Figure 41:
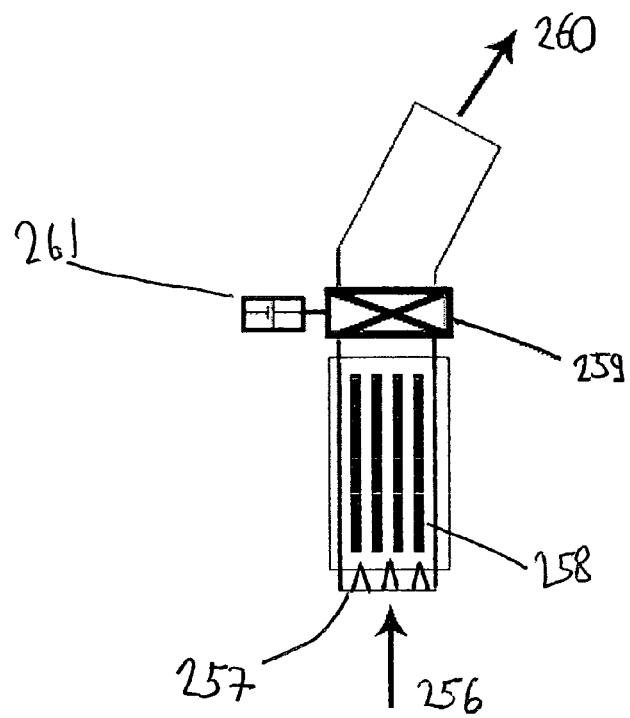
FIG. 41 shows a portable unit with a rechargeable battery to drive a fan.

FIG. 41 shows a portable system which works in a similar way to the system shown in FIG. 34, but provides local cooling rather than cooling for a whole room. Air enters 256 through some vents 257 and passes over the PCM 258, pulled by a fan 259, and out towards the user 260. An interface and control system 261 is provided to allow the user to activate the unit. Feedback is provided to the user to show the amount of cooling energy remaining. A rechargeable battery powers the fan when it is not connected to a power supply. Sensors monitor the air temperature coming into the unit and the temperature or state of the PCM to control the air flow during the 'night' cycle.

Figure 42:
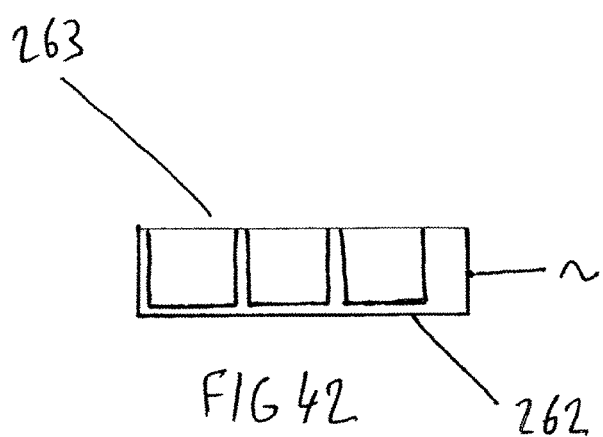
FIG. 42 shows a docking station suitable for charging the PCM module of FIG. 41.

Preferably a docking system 262 as shown in FIG. 42 holds one or more units 263, while the batteries are charged, either though a direct electrical contact or induction charging. The docking station may have window, window sill or wall mountings to hold the units outside securely, while both the batteries are charged and the PCM is cooled overnight. Alternatively the docking station may be used inside on a desk or similar.

The unit can be manually placed outside during the night, so ducting is not required to connect the units up to a supply of outside air. During the day the units can be placed inside whenever they are required. The PCM pack in the portable unit is also separable form the control unit or fan unit. This means different PCM batteries can be used, when one runs out another can be taken. These packs may be stored/frozen in the fridge or if using water the freezer. For additional cooling, when the night cooling is not sufficient.

Figure 43:
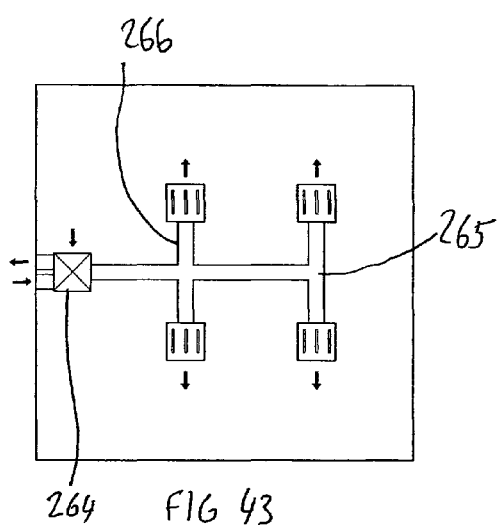
FIGS. 43 to 52 show plan views of arrangements of PCM modules for a given room.

FIG. 43 shows an arrangement of modules. In this embodiment there is a single control module 264 drawing fresh air from outside. The fresh air is circulated through duct 265 which is provided with a number of laterally extending channels such as channel 266 which terminate with a PCM module. Duct 265 is preferably insulated. Stale air may be drawn through control module 264 out of the room.

Figure 44:
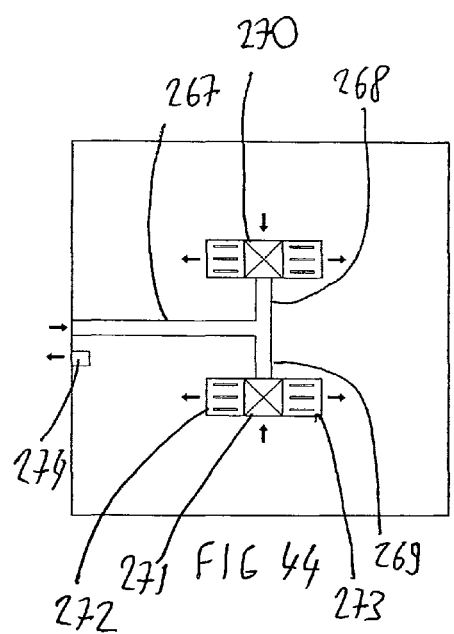

FIG. 44 shows a duct 267 which draws air from outside. The duct incorporates two laterally extending channels 268 and 269. A control unit is attached to respective laterally extending channels. The control modules 270 and 271 draw stale air from the room and fresh air through two adjacent PCM modules 272 and 273. An additional vent for drawing stale air out from the room is provided as module 274.

Figure 45:
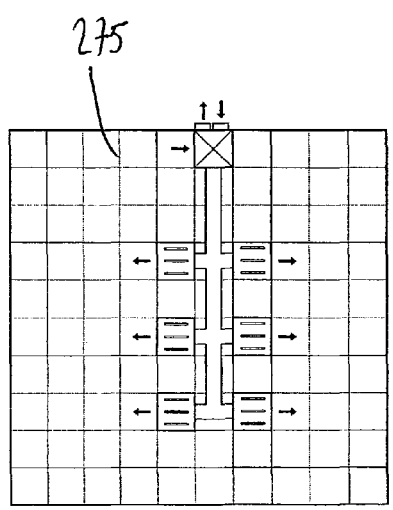

The configuration of FIG. 45 is similar to the configuration of FIG. 43 but with six laterally extending channels each leading to their respective PCM modules. The various modules may be individually attached to a false ceiling framework formed by a number of support members such as support member 275.

Figure 46:
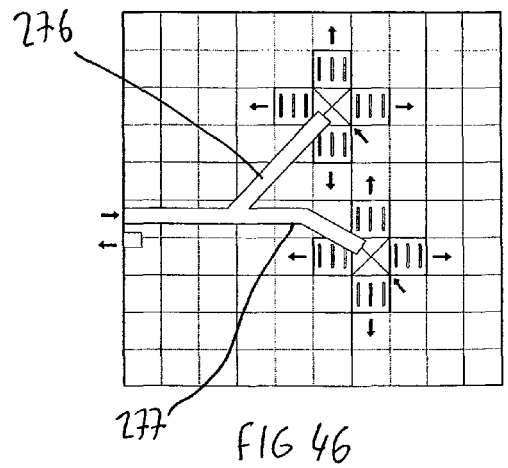

FIG. 46 shows an embodiment of the kind shown in FIG. 44, but incorporated into a false ceiling. In addition, the two laterally extending channels 276 and 277 form a "V" shape, whilst each control unit is in communication with four adjacent PCM modules.

Some of the advantages of the preceding FIGS. 43 to 46 are that the arrangements are easily scalable since they allow the simple addition of more PCM modules to meet a particular room air conditioning requirement. Since the PCM modules in a preferred embodiment have no powered bits these may be readily retrofitted to existing powered units. These can use existing ventilation, ducts and forced ventilation systems. As shown in FIG. 46, for example, a single control system can drive many units. A single control system may also be employed to drive multiple units in multiple rooms.

The efficiencies are of the order of 10 times better than ordinary heat pumps. More specifically, the ratio of heat energy to electrical energy is ten times better (COP rating). For heat pump this is about 3 whilst for the arrangements presented herein about 30.

Figure 47:
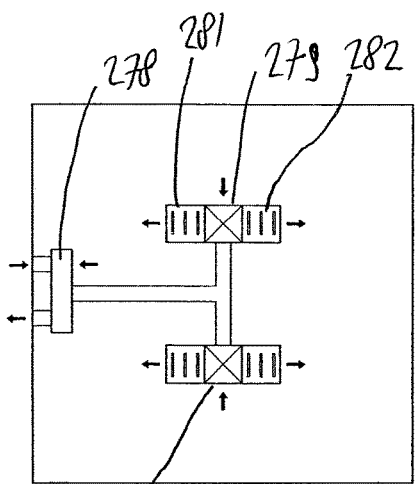

FIG. 47 shows an arrangement incorporating a backup system inside a room. The backup unit 278 draws fresh air into the room whilst exhausting air through a separate duct. A duct is provided to channel air to respective control units 279 and 280. Each control unit is attached to two separatable PCM modules such as modules 281 and 282. The backup unit may be of the kind described in previous embodiments.

Figure 48:
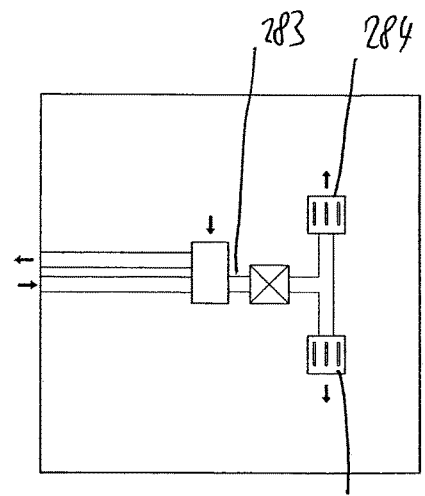

FIG. 48 shows a further arrangement incorporating a backup unit in the form of a pettier or heat pump. In this configuration the control unit is located on a duct 283 instead of being adjacent to PCM modules 284 and 285. In this configuration the backup system may have an additional valve to allow it to either function in the backup mode or simply function with air being directly pumped to the PCM modules during the cooling phase.

Figure 49:
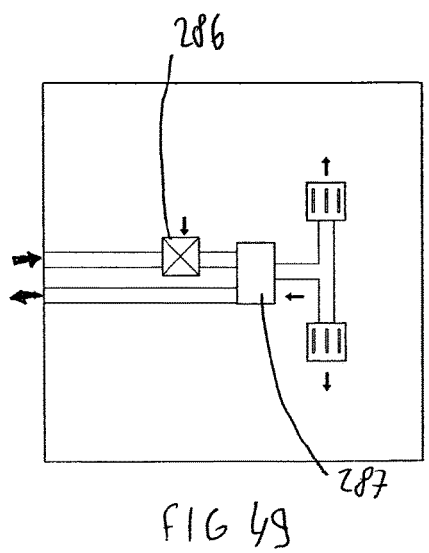

A further backup arrangement is provided in FIG. 49. In this configuration the air into the control unit 286 determines the amount of air inside/outside. The backup unit 287 draws state air in from the room.

As a further backup system, it may be incorporated into the PCM module.

A further modification of the arrangement would be to have the backup system after the PCM units or in them so as to provide a boost to air going into the room during the day.

In the arrangements of FIGS. 47 to 49, the PCM provides "free" cooling most of the year but a backup system is available if the night time temperature is not cold enough. Alternatively, these arrangements can allow the systems to be more powerful but with a reduction of energy usage of for example 20 to 40%. The reduction in energy usage is typically 60-80%.

Figure 50:
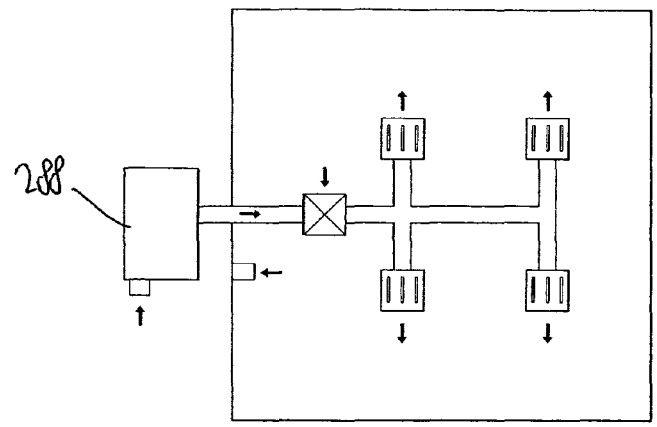
Figure 51:
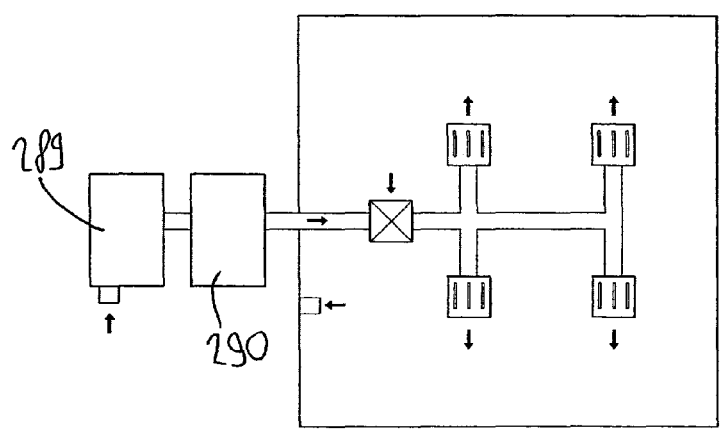
Figure 52:
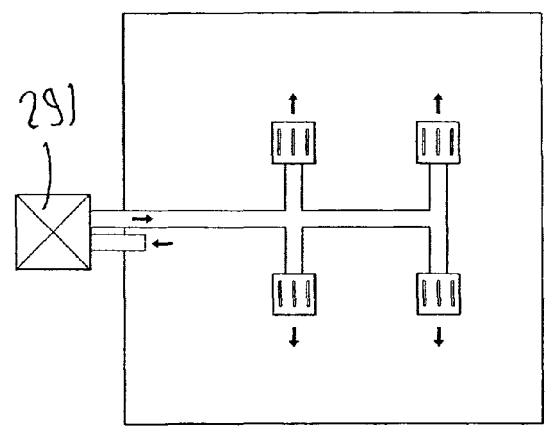

FIGS. 50 to 52 show an arrangement of the kind shown in FIG. 43 associated with: a forced air system 288 (as shown in FIG. 50), a forced air system 289 in conjunction with a backup system providing a cooling boost 290 (FIG. 51) and a configuration where the control unit 291 is located outside the room (FIG. 52). This control unit may have the ability to use/re-circulate internal air.

During the day enough fresh air is sent through the system for breathing.

At night air is forced through the system from outside to freeze the PCM.

In the embodiment of FIG. 51 it is possible to use an existing ventilation system plus the configuration of any of the preceding embodiments fitted onto it.

One of the advantages of external forced air systems is that a single more powerful control unit with a fan is mounted outside where noise is not a problem. Another advantage of the system is that in combination with a forced air system when these are already installed, it takes advantage of the existing ventilation system rather than duplicating it with the modular units. It allows the addition of PCM modules to the ventilation system and nothing else.

An optional internal control unit can be used inside to control the room temperature for individuals and allow recirculation of air inside.

In a winter mode, by the end of the day warm stuffy air is passed over the PCM melting it. The heat is then stored in the PCM encased with insulation for the following day. As the system provides fresh air during the day this is passed over the PCM so warming it as it enters the room.

Further Descriptive Aspects

A cooling device that uses the 24 hour daily cycle to store cooling energy from outside night time air and releases it during the day, which comprises a thermally insulated PCM, an electric fan and a control system to control the flow of air through the PCM.

A device that is portable and moved outside at night time to cool the PCM, with a battery pack to provide power to a fan and optional docking station to charge it.

A device that can be retrofitted to a building by mounting to the wall or ceiling, or that rests on the floor with the option of rollers, and connects to the outside air through a duct.

A control system which controls the flow of air over the PCM with a valve or a fan, by using a timer and optional sensors to measure the temperature inside, outside, of the PCM or its electrical resistance.

A control system which pulls cool air over the PCM to freeze it when either the outside air temperature is lower than the phase change temperature, at a preset time, or when the user manually sets it to 'night' mode.

A control system that when in 'night' mode shuts off the air when the PCM has reached the desired temperature or the electrical resistance has changed to indicate that it is completely frozen.

A user interface for the control system that can be part of the main unit or separate to allow the user to turn the units on and off, change the mode, set the timer, or select the amount of cooling.

A user interface that can connect using wireless protocols, infrared, or that is physically wired so that a single user interface can control individual or multiple units at once.

A control system that either when set by the user, when a preset tie is reached, as the indoor temperature rises, or with a combination of inputs provides cooling by activating the fan or valve to pull air from inside or outside over the PCM and releasing it into the room.

A control system that controls the ratio of air from outside to inside to ensure a minimum of fresh air is provided for breathing, but increases the proportion of outside air if the temperature outside is lower than inside.

A control system and interface that monitors the batteries to indicate the power remaining to the user, and controls their charging when connected to a power source.

A control system and interface that feeds back to the user how much cooling energy remains in the unit.

An optional docking station that the units can be mounted in to charge their batteries and holds the units securely on a window sill, wall or elsewhere.

Vents to allow air in and out of the units.

A valve to control the flow of air from inside or outside over the PCM.

An optional valve to control the flow of air from the unit into the room or back outside.

Attachment points to connect ducting or multiple units together.

A modular series of ducting or a flexible hose and fittings that individual or multiple units can connect to and in turn is connected to the outside to carry air in or out, through a window, ceiling or wall unit.

An end unit where the ducting connects to the outside air and is mounted to the window, ceiling or wall, with the option for an air filter and separate valve to let excess air from the room back outside.

An optional air filter in the unit.

Mounting the PCM inside the ducting.

Fittings to attach or embed an optional lighting system.

In a further aspect, the system incorporates a low energy cooling module as a freestanding, portable, ceiling or wall mounted device that can be retrofitted to a building. The unit contains a suitable PCM that will provide the user with a comfortable indoor temperature according to local climatic conditions. The unit will rely on fluctuating 24 hour temperature cycles.

The PCM material itself has thermal conductive properties of the order of 0.5 to 1 W/MK. A thermal conductor is added to the material or located adjacent to the material which has a greater conductive property than the PCM material on its own. A particularly beneficial level of thermal conductivity would be for the conductors to have a conductivity of at least 5 W/MK. A range of 5 to 20 is envisaged for plastics material conductors whilst a greater range of say 100 to 250 is envisaged for metals.

The invention claimed is:

1. A modular air conditioning system, comprising:
a plurality of separately transportable cooling modules, each cooling module comprising a plurality of phase change material (PCM) packs in a thermally insulating housing with spaces between the PCM packs forming channels for the flow of air from an air inlet of the housing to an air outlet of the housing; and
a transportable control module that is both spatially separate from and separable from the cooling modules, wherein the transportable control module comprises:
a housing with an air inlet for receiving air directly from outside of the modular air conditioning system and at least one air outlet; and
a pump for causing, in use, a flow of air from the air inlet of the housing of the control module to the at least one air outlet of the housing of the control module;
wherein, in use, the modular air conditioning system is assembled such that the at least one air outlet of the control module is connected to an air inlet of a first cooling module of the cooling modules, and the air outlet of the first cooling module is connected to an air inlet of a second cooling module of the cooling modules such that the pump of the control module causes the flow of air from the air outlet of the control module, through the air inlet of the first cooling module, through the air outlet of the first cooling module, through an air inlet of the second cooling module to the air outlet of the second cooling module.

2. The modular air conditioning system of claim 1, further comprising a transportable backup module incorporating one of a heat pump, an inverter, a peltier cooler, or an evaporative cooler; and further incorporating means for connecting said backup module to said cooling module.

3. The modular air conditioning system of claim 1, wherein said PCM is selected from at least one of a salt, a salt-based hydrate, an organic material, or any combination thereof.

4. The modular air conditioning system of claim 3, wherein said salt-based hydrate is selected from the group comprising hydrated calcium chloride and hydrated sodium sulphate.

5. The modular air conditioning system of claim 3, wherein said organic material is paraffin-based.

6. The modular air conditioning system of claim 1, wherein each PCM pack comprises a laminate of a first conducting panel and a second conducting panel enclosing a portion formed primarily of PCM; wherein said portion of PCM incorporates thermal conductors.

7. The modular air conditioning system of claim 6, wherein said thermal conductors form hexagonal cells when viewed in plan.

8. The modular air conditioning system of claim 6, wherein said laminate incorporates a third conductive panel and a fourth conductive panel enclosing a second portion formed primarily of PCM; and a corrugated thermally conductive panel located between said second and third conductive panels.

9. The modular air conditioning system of claim 6, wherein said conductive panels are selected from the group comprising aluminium-based material, steel-based material, and plastics material.

10. The modular air conditioning system of claim 6, wherein said thermal conductors incorporate a conductive compound mixed into said PCM.

11. The modular air conditioning system of claim 10, wherein said conductive compound is carbon black.

12. A cooling module adapted for use in the system of claim 1.

13. A control module adapted for use in the system of claim 1.

14. A backup module adapted for use in the system of claim 2.

15. A modular air conditioning system, comprising:
a plurality of separately transportable cooling modules, each cooling module comprising a plurality of phase change material (PCM) packs in a thermally insulating housing with spaces between the PCM packs forming channels for the flow of air from an air inlet of the housing to an air outlet of the housing; and
a transportable control module that is both spatially separate from and separable from the cooling modules, wherein the transportable control module comprises:
a housing with an air inlet for receiving air directly from outside of the modular air conditioning system and at least one air outlet; and
a pump for causing, in use, a flow of air from the air inlet of the housing of the control module to the at least one air outlet of the housing of the control module;
wherein, in use, the modular air conditioning system is assembled such that the at least one air outlet of the control module is connected to an air inlet of a first cooling module of the plurality of cooling modules, and the at least one air outlet of the control module is connected to an air inlet of a second cooling module of the plurality of cooling modules such that the pump of the control module causes the flow of air from the air outlet of the control module, through the air inlet of the first cooling module, to the air outlet of the first cooling module, and the pump causes the flow of air from the air outlet of the control module, through the air inlet of the second cooling module, to the air outlet of the second cooling module.

* * * * *

UNITED STATES PATENT AND TRADEMARK OFFICE
CERTIFICATE OF CORRECTION

PATENT NO.        : 9,719,688 B2
APPLICATION NO.   : 12/866662
DATED             : August 1, 2017
INVENTOR(S)       : Matthew Holloway et al.

It is certified that error appears in the above-identified patent and that said Letters Patent is hereby corrected as shown below:

On the Title Page

Line 3 of the Abstract reads, ". . . insulting said number of PCM packs; . . ." which should read, "insulating said number of PCM packs; . . ."

In the Specification

Column 1, Line 33 reads, ". . . insulting said number of PCM packs; . . ." which should read, "insulating said number of PCM packs; . . ."

Column 1, Line 41 reads, ". . . variable energy requirement. It may also . . ." which should read ". . . variable energy requirements. It may also . . ."

Column 1, Line 51 reads, ". . . compared to module incorporating power . . ." which should read ". . . compare to modules incorporating power . . ."

Column 2, Line 9 reads, ". . . subsidiary aspect, the or each PCM . . ." which should read ". . . subsidiary aspect, each PCM . . ."

Column 2, Line 51 reads, ". . . incorporates a pettier cooler." which should read ". . . incorporates a peltier cooler."

Column 3, Line 8 reads, ". . . an inverter, a pettier cooler, or an . . ." which should read ". . . an inverter, a peltier cooler, or an . . ."

Column 4, Line 40 reads, ". . . incorporating a pettier cooler." which should read ". . . incorporating a peltier cooler."

Column 4, Line 44 reads, ". . . as part of a pettier cooler." which should read ". . . as part of a peltier cooler."

Signed and Sealed this
Sixth Day of February, 2018

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,719,688 B2

Column 7, Line 37 reads, ". . . allows the KM to be at an optimal . . ." which should read ". . . allows the PCM to be at an optimal . . ."

Column 7, Line 41 reads, ". . . carbon nano-tubes, suspended carbon black . . ." which should read ". . . carbon nano-tubes, or suspended carbon black . . ."

Column 8, Line 10 reads, ". . . 13A and 13B a PCM pack . . ." which should read ". . . 13A and 13B show a PCM pack . . ."

Column 8, Line 28 reads, ". . . function f the PCM packaging with . . ." which should read ". . . function of the PCM packaging with . . ."

Column 10, Line 12 reads, ". . . pettier cooler in order to cool air . . ." which should read ". . . peltier cooler in order to cool air . . ."

Column 10, Line 19 reads, ". . . as described previously, it allows the backup . . ." which should read ". . . as described previously. It allows the backup . . ."

Column 10, Line 25 reads, ". . . pettier cooling systems. It also allows . . ." which should read ". . . peltier cooling systems. It also allows . . ."

Column 10, Line 38 reads, ". . . detail how a pettier backup . . ." which should read ". . . detail how a peltier backup . . ."

Column 10, Line 39 reads, ". . . may be formed. A pettier may be located . . ." which should read ". . . may be formed. A peltier may be located . . ."

Column 10, Line 47 reads, ". . . provided such as pettier 152. The pettier 152 has a hot . . ." which should read ". . . provided such as peltier 152. The peltier 152 has a hot . . ."

Column 10, Line 56 reads, ". . . where a further pettier based backup module . . ." which should read ". . . where a further peltier based backup module . . ."

Column 11, Line 8 reads, ". . . or pettier backup system to separate the hot . . ." which should read ". . . or peltier backup system to separate the hot . . ."

Column 12, Line 10 reads, ". . . is formed in Layers of in succession . . ." which should read ". . . is formed in layers of in succession . . ."

Column 12, Line 30 reads, ". . . combined heat exchanger and a PCM . . ." which should read ". . . combined heat exchangers and a PCM . . ."

Column 14, Line 17 reads, ". . . fan drawn air through the PCM . . ." which should read ". . . fan draws air through the PCM . . ."

CERTIFICATE OF CORRECTION (continued)
U.S. Pat. No. 9,719,688 B2

Column 14, Line 35 reads, ". . . either though a direct electrical contact . . ." which should read ". . . either through a direct electrical contact . . ."

Column 14, Line 45 reads, ". . . is also separable form the control unit . . ." which should read ". . . is also separable from the control unit . . ."

Column 14, Line 48 reads, ". . . the fridge or if using water the freezer. For additional . . ." which should read ". . . the fridge or if using water the freezer, for additional . . ."

Column 15, Line 33 reads, ". . . in the form of a pettier or heat . . ." which should read ". . . in the form of peltier or heat . . ."

Column 15, Line 43 reads, ". . . draws state air in from the room." which should read ". . . draws stale air in from the room."